US008892693B2

(12) United States Patent
Quan et al.

(10) Patent No.: US 8,892,693 B2
(45) Date of Patent: Nov. 18, 2014

(54) ENABLING FRAGMENT-BASED MOBILE DEVICE APPLICATION STREAMING

(71) Applicant: Nextbit Systems Inc., San Francisco, CA (US)

(72) Inventors: Justin Quan, San Francisco, CA (US); Michael A. Chan, San Francisco, CA (US)

(73) Assignee: Nextbit Systems Inc., San Francisco, CA (US)

(*) Notice: Subject to any disclaimer, the term of this patent is extended or adjusted under 35 U.S.C. 154(b) by 0 days.

(21) Appl. No.: 14/160,444

(22) Filed: Jan. 21, 2014

(65) Prior Publication Data

US 2014/0136666 A1 May 15, 2014

Related U.S. Application Data

(63) Continuation-in-part of application No. 13/865,515, filed on Apr. 18, 2013.

(60) Provisional application No. 61/708,794, filed on Oct. 2, 2012.

(51) Int. Cl.
G06F 15/16 (2006.01)
H04L 29/08 (2006.01)
A63F 13/40 (2014.01)
H04L 12/26 (2006.01)
H04L 29/06 (2006.01)

(52) U.S. Cl.
CPC ............... *H04L 67/10* (2013.01); *A63F 13/10* (2013.01); *H04L 43/04* (2013.01); *H04L 65/4069* (2013.01)
USPC .......................... 709/219; 709/217; 709/218

(58) Field of Classification Search
CPC  G06F 8/60; G06F 17/30017; G06F 17/30575
See application file for complete search history.

(56) References Cited

U.S. PATENT DOCUMENTS

| 6,811,486 B1 | 11/2004 | Luciano, Jr. |
| 7,315,740 B2 | 1/2008 | Maes |
| 7,326,117 B1 | 2/2008 | Best |
| 7,774,457 B1 | 8/2010 | Talwar et al. |
| 7,903,383 B2 | 3/2011 | Fukano et al. |

(Continued)

OTHER PUBLICATIONS

Co-Pending U.S. Appl. No. 14/221,174 by Chan, M.A., et al., filed Mar. 20, 2014.

(Continued)

*Primary Examiner* — Djenane Bayard
(74) *Attorney, Agent, or Firm* — Perkins Coie, LLP

(57) ABSTRACT

Technology for decomposing an application into fragments and streaming the application in fragments is disclosed herein. According to at least one embodiment, a computer-implemented method includes steps of running an intermediary application at a mobile device to enable the mobile device to run the video game application by running multiple game application fragments, the intermediary application acting as an intermediary between the video game application and the game application fragments by determining a next game application fragment for each of the game application fragments; running, at the mobile device, an instance of the video game application by running a first application fragment of the game application fragments at the mobile device; requesting, by the intermediary application, a second application fragment of the game application fragments corresponding to a second portion of the video game application; and receiving, at the mobile device, the second application fragment.

25 Claims, 6 Drawing Sheets

(56) References Cited

U.S. PATENT DOCUMENTS

| | | | |
|---|---|---|---|
| 8,005,956 | B2 | 8/2011 | Williams et al. |
| 8,234,348 | B1 | 7/2012 | Tulchinsky et al. |
| 8,315,977 | B2 | 11/2012 | Anand et al. |
| 8,423,511 | B1 | 4/2013 | Bhatia |
| 8,438,298 | B2 | 5/2013 | Arai et al. |
| 8,473,577 | B2 | 6/2013 | Chan |
| 8,475,275 | B2 | 7/2013 | Weston et al. |
| 8,478,816 | B2 | 7/2013 | Parks et al. |
| 8,495,129 | B2 | 7/2013 | Wolman et al. |
| 8,515,902 | B2 | 8/2013 | Savage |
| 8,589,140 | B1 | 11/2013 | Poulin |
| 8,606,948 | B2 | 12/2013 | Evans et al. |
| 8,747,232 | B1 | 6/2014 | Quan et al. |
| 8,764,555 | B2 | 7/2014 | Quan et al. |
| 8,774,449 | B2 | 7/2014 | Kajihara et al. |
| 8,840,461 | B2 | 9/2014 | Quan |
| 2001/0039212 | A1 | 11/2001 | Sawano et al. |
| 2008/0055311 | A1 | 3/2008 | Aleksic et al. |
| 2008/0220878 | A1 | 9/2008 | Michaelis |
| 2009/0063690 | A1 | 3/2009 | Verthein et al. |
| 2009/0077263 | A1 | 3/2009 | Koganti et al. |
| 2009/0106110 | A1 | 4/2009 | Stannard et al. |
| 2009/0204966 | A1 | 8/2009 | Johnson et al. |
| 2010/0173712 | A1 | 7/2010 | Buhr |
| 2010/0235511 | A1 | 9/2010 | Kai |
| 2010/0332401 | A1 | 12/2010 | Prahlad et al. |
| 2011/0093567 | A1 | 4/2011 | Jeon et al. |
| 2011/0126168 | A1 | 5/2011 | Ilyayev |
| 2011/0252071 | A1 | 10/2011 | Cidon |
| 2011/0286026 | A1 | 11/2011 | Matsuzawa |
| 2012/0017236 | A1 | 1/2012 | Stafford et al. |
| 2012/0023250 | A1* | 1/2012 | Chen et al. ............... 709/231 |
| 2012/0028714 | A1 | 2/2012 | Gagner et al. |
| 2012/0036239 | A1 | 2/2012 | Donaghey et al. |
| 2012/0079095 | A1 | 3/2012 | Evans et al. |
| 2012/0079126 | A1 | 3/2012 | Evans et al. |
| 2012/0084803 | A1 | 4/2012 | Johansson et al. |
| 2012/0110568 | A1 | 5/2012 | Abel et al. |
| 2012/0149309 | A1 | 6/2012 | Hubner et al. |
| 2012/0171951 | A1 | 7/2012 | 't Hooft |
| 2012/0203932 | A1 | 8/2012 | da Costa et al. |
| 2012/0210343 | A1 | 8/2012 | McCoy et al. |
| 2012/0303778 | A1* | 11/2012 | Ahiska et al. ............ 709/223 |
| 2013/0007203 | A1 | 1/2013 | Szu |
| 2013/0008611 | A1 | 1/2013 | Marcus et al. |
| 2013/0044106 | A1 | 2/2013 | Shuster et al. |
| 2013/0045795 | A1 | 2/2013 | Fiedler |
| 2013/0117806 | A1 | 5/2013 | Parthasarathy et al. |
| 2013/0159890 | A1 | 6/2013 | Rossi |
| 2013/0219381 | A1 | 8/2013 | Lovitt |
| 2013/0223240 | A1* | 8/2013 | Hayes et al. ............. 370/252 |
| 2013/0304898 | A1 | 11/2013 | Aggarwal et al. |
| 2014/0040239 | A1 | 2/2014 | Hirsch |
| 2014/0101300 | A1* | 4/2014 | Rosensweig et al. ...... 709/223 |

OTHER PUBLICATIONS

Co-Pending U.S. Appl. No. 14/251,463 by Quan, J., et al., filed Apr. 11, 2014.
Co-Pending U.S. Appl. No. 14/252,674 by Chan, M.A., et al., filed Apr. 14, 2014.
Notice of Allowance mailed Apr. 15, 2014, Co-pending U.S. Appl. No. 14/167,834, by Quan et al., filed Jan. 29, 2014.
Co-Pending U.S. Appl. No. 14/228,190 by Quan, J., et al., filed Mar. 27, 2014.
Co-Pending U.S. Appl. No. 14/042,567 by Chan, M.A., et al., filed Sep. 30, 2013.
Co-Pending U.S. Appl. No. 14/042,398 by Chan, M.A., et al., filed Sep. 30, 2013.
Design U.S. Appl. No. 29/486,424 by Chan, M.A., et al., filed Mar. 28, 2014.
Non-Final Office Action mailed Apr. 3, 2014, U.S. Appl. No. 14/158,682 by Quan, J., et al., filed Jan. 17, 2004.
Non-Final Office Action mailed Apr. 2, 2014, U.S. Appl. No. 14/179,709 by Quan, J., et al., filed Feb. 13, 2014.
Co-Pending U.S. Appl. No. 14/179,709 by Quan, J., et al., filed Feb. 13, 2014,.
Co-Pending U.S. Appl. No. 14/179,744 by Quan, J., et al., filed Feb. 13, 2014.
Non-Final Office Action mailed Mar. 7, 2014, Co-pending U.S. Appl. No. 14/158,715, by Quan et al., filed Jan. 17, 2014.
Non-Final Office Action mailed Mar. 10, 2014, Co-pending U.S. Appl. No. 14/173,680, by Quan et al., filed Feb. 5, 2014.
Co-Pending U.S. Appl. No. 13/772,163 by Quan, J., filed Feb. 20, 2013.
Co-Pending U.S. Appl. No. 14/043,034 by Chan, M.A., et al., filed Oct. 1, 2013.
Co-Pending U.S. Appl. No. 14/158,682 by Quan, J., et al., filed Jan. 17, 2004.
Co-Pending U.S. Appl. No. 14/158,715 by Quan, J., et al., filed Jan. 17, 2014.
Co-Pending U.S. Appl. No. 14/173,680 by Quan, J., et al., filed Feb. 5, 2014.
Co-Pending U.S. Appl. No. 14/167,834 by Quan, J., et al., filed Jan. 29, 2014.
Co-Pending U.S. Appl. No. 13/865,515 by Quan, J., et al., filed Apr. 18, 2013.
Co-Pending U.S. Appl. No. 14/158,733 by Quan, J., et al., filed Jan. 17, 2014.
Co-Pending U.S. Appl. No. 14/167,939 by Quan, J., et al., filed Jan. 29, 2014.
Co-Pending U.S. Appl. No. 14/042,509 by Chan, M.A., et al., filed Sep. 30, 2013.
Co-Pending U.S. Appl. No. 14/267,823 by Chan, M.A., et al., filed May 1, 2014.
Non-Final Office Action mailed Jun. 9, 2014, for U.S. Appl. No. 14/167,939 by Quan, J., et al., filed Jan. 29, 2014.
Restriction Requirement mailed Jun. 12, 2014, for U.S. Appl. No. 14/251,463 by Quan, J., et al., filed Apr. 11, 2014.
Notice of Allowance mailed May 20, 2014, Co-Pending U.S. Appl. No. 14/173,680, by Quan et al., filed Feb. 5, 2014.
Non-Final Office Action mailed May 27, 2014, U.S. Appl. No. 14/158,733 by Quan, J., et al., filed Jan. 17, 2014.
Notice of Allowance mailed May 14, 2014, Co-Pending U.S. Appl. No. 14/158,715, by Quan et al., filed Jan. 17, 2014.
Non-Final Office Action mailed May 8, 2014, U.S. Appl. No. 14/179,744 by Quan, J., et al., filed Feb. 13, 2014.
Final Office Action mailed Jul. 24, 2014, U.S. Appl. No. 14/179,709 by Quan, J., et al., filed Feb. 13, 2014.
Non-Final Office Action mailed Aug. 26, 2014, for U.S. Appl. No. 14/267,823 by Chan, M.A., et al., filed May 1, 2014.
Notice of Allowance mailed Aug. 12, 2014, U.S. Appl. No. 14/179,709 by Quan, J., et al., filed Feb. 13, 2014.
Restriction Requirement mailed Aug. 29, 2014, for U.S. Appl. No. 14/252,674 by Chan, M.A., et al., filed Apr. 14, 2014.

* cited by examiner

US 8,892,693 B2

ENABLING FRAGMENT-BASED MOBILE DEVICE APPLICATION STREAMING

PRIORITY CLAIM

This application is a continuation-in-part of U.S. patent application Ser. No. 13/865,515, entitled "MOBILE DEVICE APPLICATION STREAMING", which was filed on Apr. 18, 2013, which is incorporated by reference herein in its entirety, and which claims the benefit of U.S. Provisional Patent Application No. 61/708,794, entitled "CLOUD COMPUTING INTEGRATED OPERATING SYSTEM", which was filed on Oct. 2, 2012.

FIELD OF THE INVENTION

At least one embodiment of the present invention pertains to mobile device applications, and more particularly, to streaming of mobile applications designed to run on mobile devices.

BACKGROUND

In recent years, the use of wireless networks to distribute content within a service area thereof has become increasingly common. For example, a mobile device within range of a base station of a third generation (3G) or fourth generation (4G) cellular network is capable of "pulling content" from a remote server, for example, a content server, coupled to the base station. A mobile device can download a mobile application from an application distribution platform via a wireless network such as a WiFi or cellular network. Even with the increasing network speed of the modern WiFi and cellar networks, it can still take a significant time to download a large mobile application. A user of the mobile device has to wait for the download to be finished before the user can start installing and running the mobile application on the mobile device. Even for a user only wants to try a small percentage of the functionalities or stages of a mobile application, the user still need to download the whole application before the user can try any portion of the application.

Furthermore, a modern application can include a large amount multimedia content and can have a size of several gigabytes (GBs). A user of a mobile device may find that the mobile device does not have enough available storage space to accommodate the application. Therefore, the user may be forced to delete some of the existing applications or files stored on the mobile device, in order to run the application.

SUMMARY

Technology introduced here provides a mechanism to enable a user to run an application on a computing device before the whole application has been downloaded to the computing device. A processing server can decompose an application into a plurality of fragments. Each fragment of the application corresponds to one or more user interfaces, such as activities in an Android environment or views in an iOS environment. Resources are determined for each user interface. Resources, e.g. images, texts, videos, audios, 3D models, necessary for a specific user interface are included within a corresponding fragment. The dependency relationships between the fragments are also determined.

An application can be launched on a computing device by streaming one of more fragments of the application to the computing device, or by running one or more fragments of the application at the computing device. Fragments are streamed to and cached on the computing device based on the dependency of the fragments. For example, assuming fragments 5 and 6 can be only accessed via fragment 4, if the user is currently active on fragment 4, then fragments 5 and 6 may be prioritized for streaming to the computing device. A server can further determine the probability of each fragment being used based on other users' access patterns.

The application can be decomposed into fragments using a full server processing method. For example, a processing server can run an emulator to execute the application and determine the user interfaces and resources for each fragment of the application. The application can also be decomposed into fragments using a crowd sources device processing. Computing devices that have the full application stored locally can run the application and determine the user interfaces and resources for each fragment of the application. Then the fragmenting information can be updated to a server so that the server can decompose the application on the server accordingly.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
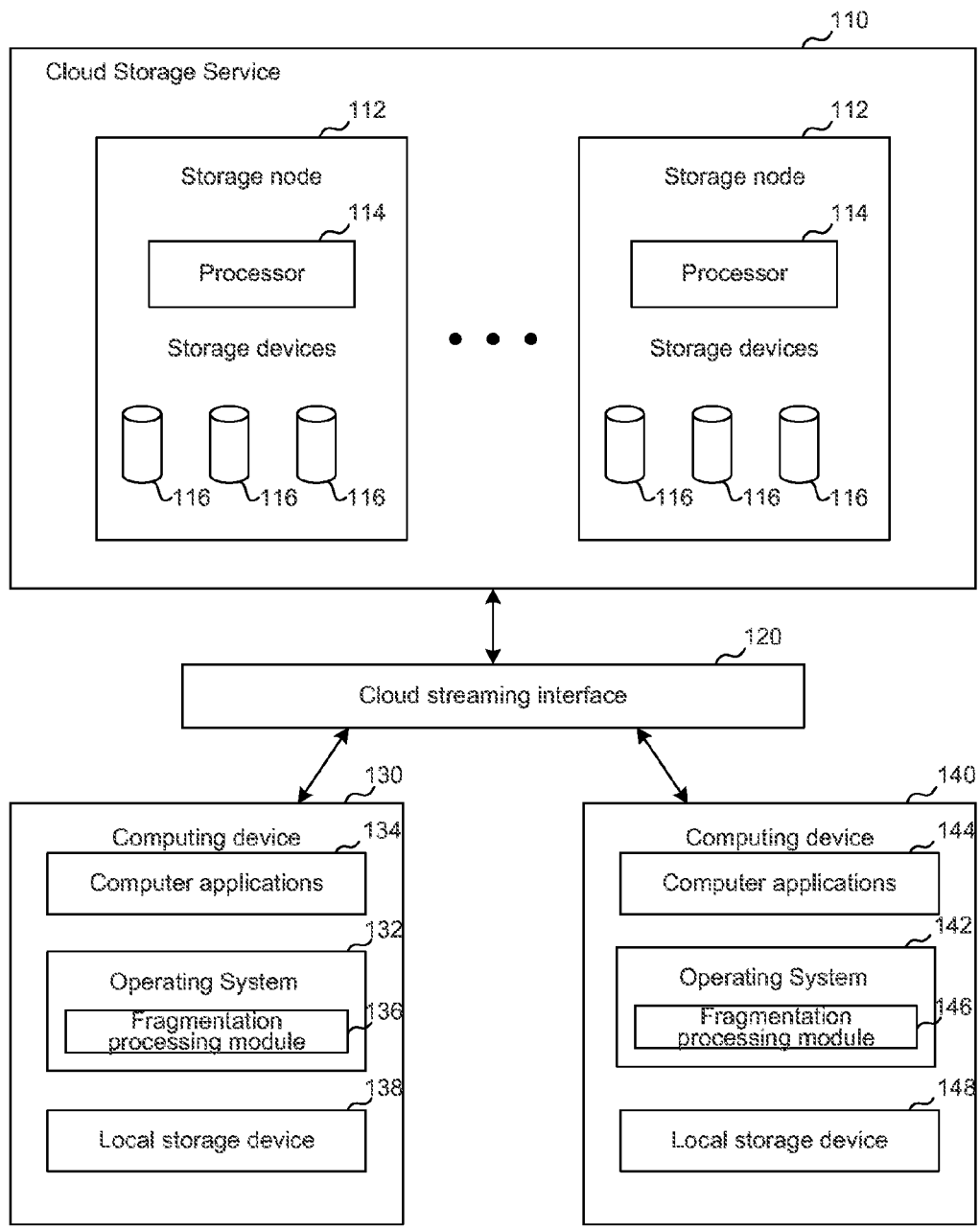
FIG. 1 illustrates an example system for streaming applications to computing devices.

FIG. 1 illustrates an example system for streaming applications computing devices. The system includes a cloud storage service 110 configured to store applications and determine fragmentation of the applications. In one embodiment, the cloud storage service 110 can be a storage cluster having computer nodes interconnected with each other by a network. The storage cluster can communicate with other computing devices via the Internet. The cloud storage service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud streaming interface 120 can also be included to stream fragments of applications from the cloud storage service to the computing device. The cloud streaming interface 120 can include network communication hardware and network connection logic to receive the information from computing devices. The network can be a local area network (LAN), wide area network (WAN) or the Internet. The cloud streaming interface 120 may include a queuing mechanism to organize fragments to be streamed to the computing devices. The cloud streaming interface 120 can communicate with the cloud storage service 110 to send requests to the cloud storage service 110 for requesting fragments of the applications.

A computing device 130 includes an operating system 132 to manage the hardware resources of the computing device 130 and provides services for running computer applications 134. The computer applications 134 stored in the computing device 130 require the operating system 132 to properly run on the device 130. The computing device 130 can backup application states of the computer applications 134 to the cloud storage service 110. The computing device 130 includes at least one local storage device 138 to store the computer applications, application fragments, and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 includes a fragmentation processing module 136 to process the application fragments streamed from the cloud storage server 110. Similarly, another computing device 140 can also retrieve application fragments from the cloud storage service 110.

Figure 2:
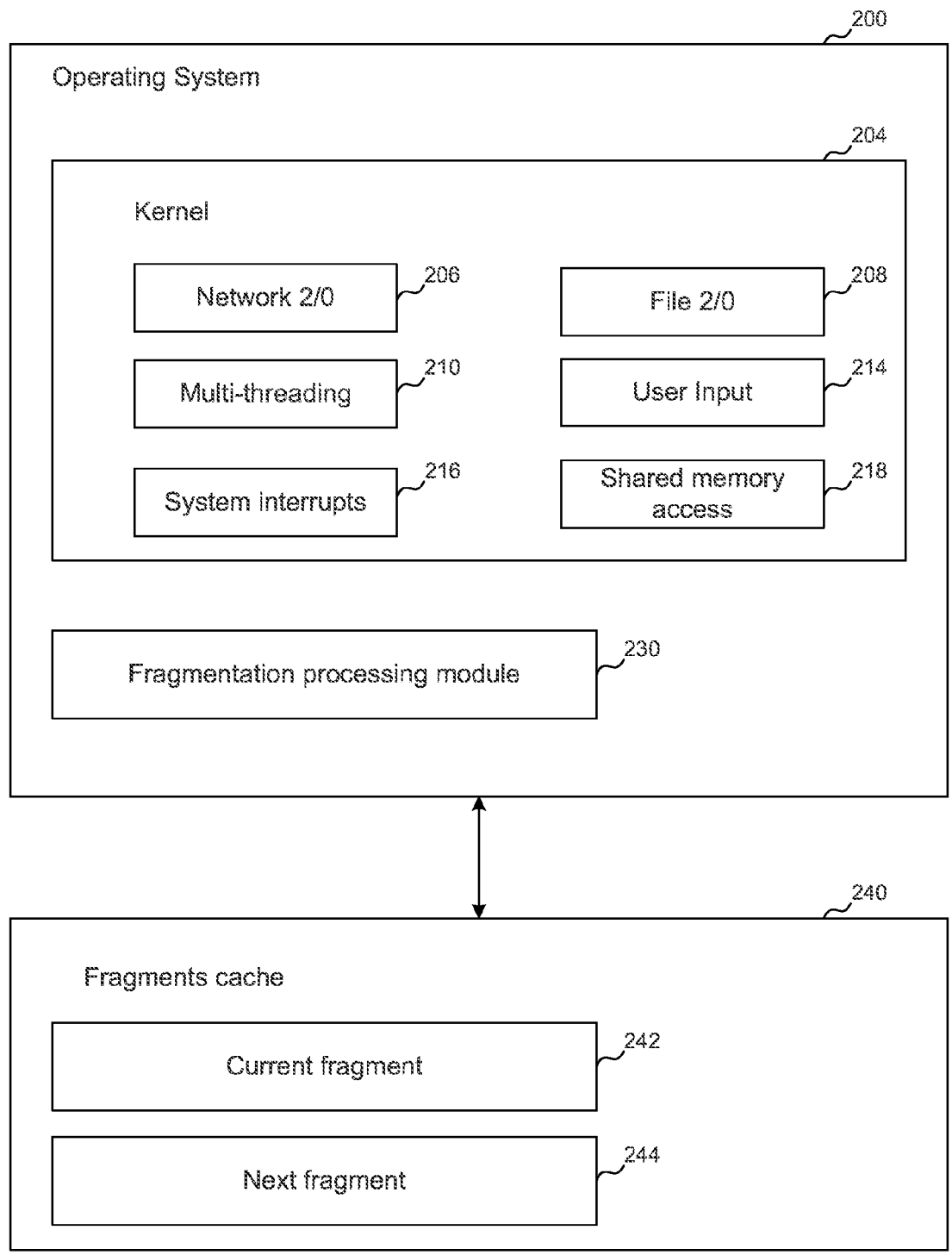
FIG. 2 illustrates an example operating system of a computing device.

FIG. 2 illustrates an example operating system of a computing device, according to one embodiment. The operating system 200 includes a kernel 204. The kernel 204 provides interfaces to hardware of the electronic device for the computer applications running on top of the kernel 204, and supervises and controls the computer applications. The kernel 204 isolates the computer applications from the hardware. The kernel 204 may include one or more intervening sources that can affect execution of a computer application. In one embodiment, the kernel 204 includes a network I/O module 206, a file I/O module 208, multi-threading module 210, user input 214, system interrupts 216, and shared memory access 218.

A fragmentation processing module 230 runs on top of the kernel 204. The fragmentation processing module 230 processes the application fragments retrieved from the cloud storage service and runs the application as that the entire application has been stored in the computing device. In the example of FIG. 2, a fragments cache 240 includes a current fragment 242 that currently run on top of the operating system 300. The fragments cache 240 can further include a next fragment 244 that is ready to start seamlessly after the current fragment 242.

Figure 3:
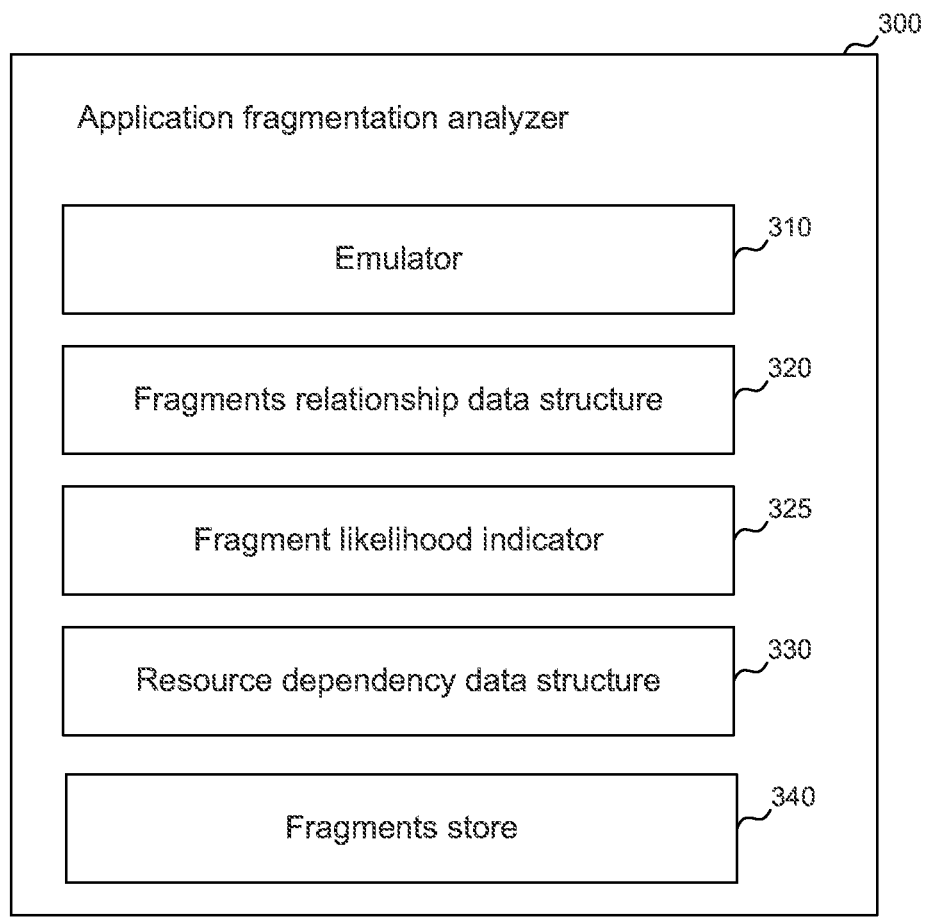
FIG. 3 illustrates an example of an application fragmentation analyzer.

FIG. 3 illustrates an example of an application fragmentation analyzer. The application fragmentation analyzer can be used by a storage server or a cloud storage service, such as the cloud storage service 110 as illustrated in FIG. 1. For example, the application fragmentation analyzer can run on the cloud storage service 110 to decompose an application into fragments. As illustrated in FIG. 3, the application fragmentation analyzer 300 includes an emulator 310 to execute the application determine the user interfaces and resources for each fragment of the application. The emulator 310 simulates an environment as a computing device on which the application runs.

By running the application on the emulator 310, the application fragmentation analyzer 300 can determine a plurality of fragments of the application. Each fragment corresponds to one or more user interfaces of the application. In an embodiment, the fragment is determined by determining the resources required to run and/or display at least one user interface. In an embodiment, a user interface is a related portion of an application. As a first example, video games frequently contain levels, and users by completing tasks or taking certain actions advance to a next level. One user interface corresponds to a first level of the video game, and the application fragment includes the resources required to run and/or display the first level. A second user interface corresponds to a second level of the video game, and the application fragment includes the resources required to run and/or display the second level. While playing the video game in the first level, the first application fragment is being run. In response to the user advancing to the second level, the second application fragment is run.

As another example, a first user interface corresponds to a first scene in the video game, and a second user interface corresponds to a second scene. The first scene takes place in a virtual geography local to an island, and the second scene takes place in a virtual geography local to a cave. One application fragment includes the resources to run and/or display the virtual geography local to the island, and a second application fragment includes the resources to run and/or display the virtual geography local to the cave. In response to the scene transitioning from the island to the cave, the second application fragment is run.

As another example, a first user interface corresponds to a first level of a video game, and a second user interface corresponds to a help portion of the video game. The second application fragment includes the resources needed to run and/or display a help system. In response to a user indicating a need for help while in the first level, such as by clicking a help button, the second application fragment is run.

As another example, a first user interface corresponds to a first activity in a productivity application and a second user interface corresponds to a second activity in the productivity application. The productivity application is Excel, and the first activity is entering data into a worksheet. The second activity is generating and displaying graphs based on the data. The first application fragment includes the resources to run and/or display the interface used by the user to enter the data, and the second application fragment includes the resources to run and/or display the interface used by the user to generate and view the graphs. In response to the user indicating a desire to generate a graph, such as by selecting a graph generation menu item, the second application fragment is run.

As another example, a first graphics module of a video game corresponds to a first application fragment that includes among other resources the resources required to run and/or display the first graphics module. A second graphics module corresponds to a second application fragment that includes among other resources the resources required to run and/or display the second graphics module. A first user interface corresponds to the first application fragment, and the other resources for the first application fragment can include resources for other graphics modules, for other portions of the first user interface, and the like. A second and a third user interface correspond to the second application fragment, and the other resources for the second application fragment can include resources for other graphics modules, for other portions of the second and/or the third user interfaces, and the like As additional examples, for an Android application, a user interface can include an activity of the Android application. For an iOS application, a user interface can include a view of the iOS application. For a HTML5 application, a user interface can include a page of the HTML5 application.

Once the fragments are determined, the application fragmentation analyzer 300 further generates a fragments relationship data structure 320. The fragments relationship data structure 320 includes the information whether a fragment can lead ("link") to another fragment during the operation of the application. For example, assuming fragments 5 and 6 can be accessed via fragment 4, the fragments relationship data structure 320 can includes information that fragment 4 can lead to fragments 5 and 6.

Fragments relationship data structure 320 can further include a fragment likelihood indicator 325. The fragment likelihood indicator 325 can indicate the likelihood that a selected next fragment will follow a previous fragment. For example, assuming fragments 5 and 6 can be accessed via fragment 4, the fragments relationship data structure 320 can include fragment likelihood indicator 325, which indicates the likelihood that fragment 5 will follow fragment 4 and the likelihood that fragment 6 will follow fragment 4. Using emulator 310 to simulate the application, the simulation determines that fragment 5 follows fragment 4 eighty percent of the time, and that fragment 6 follows fragment 4 twenty percent of the time.

By comparing the fragment likelihood indicator 325 for fragment 5 to the fragment likelihood indicator 325 for fragment 6, it can be determined that fragment 5 is much more likely that fragment 6 to follow fragment 4. The fragment likelihood indicator 320 for fragment 5 is set to 0.8, and the fragment likelihood indicator 320 for fragment 6 is set to 0.2. In some embodiments, fragments relationship data structure 320 does not contain fragment likelihood indicator 325 and fragment likelihood indicator 325 is contained in a different data structure. In an embodiment, fragment likelihood indicator 325 is determined based on code analysis rather than emulation.

The application fragmentation analyzer 300 can further generate a resource dependency data structure 330. The resource dependency data structure 330 includes information regarding the resources needed for running each fragment of the application. The resources can include images, icons, texts, audios, videos, 3D models, or other data included in the application. For instance, if a fragment 3 of the application needs to display an image A and play an audio clip B during the operation of the fragment 3 of the application, the resource dependency data structure 330 includes information that fragment 3 needs the image A and audio clip B.

Based on the information in the fragments relationship data structure 320 and the resource dependency data structure 330, the application fragmentation analyzer 300 can generate the fragments of the application in a fragments store 340. The fragments store 340 includes all the fragments of the application. In one embodiment, each specific fragment can include the resources that the specific fragment needs. In another embodiment, a fragment does not include all resources that the fragment needs. When the fragment is transmitted to a computing device, the corresponding resources are transmitted along with the fragment according to the resource dependency data structure 330.

The application fragmentation analyzer 300 decomposes an application into fragments. A computing device can download enough fragments to run the application at the current status, instead of downloading the entire application. The computer device can further download and cache the fragments that would possibly follows the fragment currently running.

The application fragmentation analyzer 300 automatically determines the fragments of the application, without human intervention. The developer of the application does not need to do any extra work for decomposing the application into fragments. The application fragmentation analyzer 300 automatically determines the fragments based on the flow of the application and the resources dependency information.

In some other embodiments, the application fragmentation analyzer can be used by as a crowd sources device processing. Computing devices that have the full application or a portion of the application stored locally can use the application fragmentation analyzer to determine the user interfaces and resources for each fragment of the application. Then the fragmenting information can be updated to a server so that the server can decompose the application on the server accordingly and streams the fragments to the next requesting computing device. The computing device does not need to determine all fragments of the application. A first computing device can just determine a portion of the application that it has run locally into fragments. This fragmenting information is collected to the server. A second computing device can stream the fragments and may possibly run an even larger portion of the application. The second computing device can generate additional fragments that the first computing device does not generate. Collectively, computing devices can generate the fragments of the application so that the server just needs to use the fragmenting information to stream the fragments to a device that requests the application in the future.

In one embodiment, the fragments of the application can be in native code format for the operating system of the computing device. In another embodiment, the fragments can be in an interpretative or markup language such as HTML5 (HyperText Markup Language 5).

In one embodiment, the operating system of the computing device includes a fragment module to process and execute the fragments. For instance, when a fragment of an application ends the operation of the fragment and leads to another fragment, the fragment module can immediately stops and cleans up the fragment, and starts running the other fragment. In another embodiment, the computing device runs a launcher program to manage the operations of the fragments of the application. For instance, the launcher program can determine that a running fragment now leads to another fragment, and accordingly starts launching the other fragment immediately.

The fragments can have different versions specifically for different types of client devices. For instance, the fragments can have both English and Chinese versions of the fragments, designed for computing devices with English or Chinese language preference, respectively. The fragments can have different versions for different types of devices, different operating systems, or different mobile operator. For instance, the fragments of an application can have two different versions designed for Android tablets running on Verizon mobile network, and iPhone smart phones running on AT&T mobile network, respectively.

The downloading and caching of the fragments can be dynamically determined by various factors of the computing device. The computing device can monitor the operation of the currently running fragments and predict the next possible fragments to be cached. The computing device can adjust the fragments streaming queue based on the current network transferring speed and the workload of the computing device.

In some embodiments, the computing device can purge ("delete") the fragments that have already been executed and are no longer needed for the current and future operation of the application. This saves the storage space and the computing device and can increase the cache space for caching the incoming fragments for potential future operation of the application.

Figure 4:
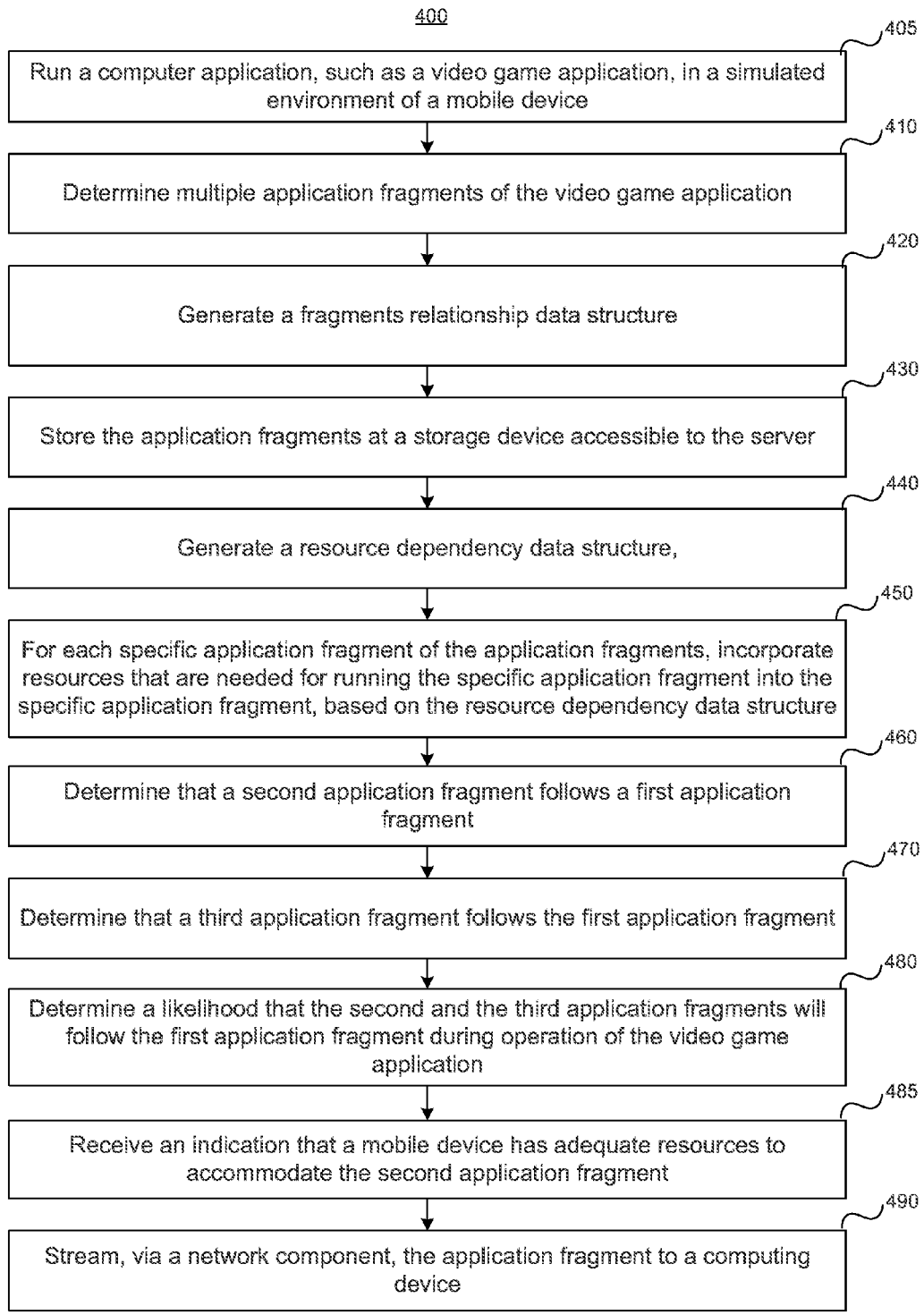
FIG. 4 illustrates an example of an application fragmentation process.

FIG. 4 illustrates an example of an application fragmentation process. The process 400 can be performed by a server, or a computing device as a part of the crowd sourced processing. Although in the embodiment illustrated in FIG. 4, steps are performed by a server, the steps can also be performed by a computing device. At step 405 of the process 400, the server runs a computer application in a simulated environment of a mobile device. The computer application of the example of FIG. 4 is a video game application. At step 410, by running the video game application in the simulated environment, the server determines multiple application fragments of a video game application. Each application fragment of the application fragments includes a code to present at least one interface of the video game application.

At step 420, the server generates a fragments relationship data structure. The fragments relationship data structure includes identifications of application fragments that leads to another application fragment of the application fragments. An application fragment can have multiple next application fragments. For example, a user may be in an application fragment corresponding to a first level of a video game. In one situation, the user advances to a second level of the video game, and the application fragment corresponding to the second level begins to run. In another situation, the user clicks a help button while in the first level application fragment, and the application fragment corresponding to a help system begins to run. In this example, both the second level application fragment and the help system application fragment are next application fragments to the first level application fragment.

At step 430, the server stores the application fragments at a storage device within the server.

At step 440, the server generates a resource dependency data structure, wherein for each specific application fragment of the application fragments, the resource dependency data structure includes identifications of resources that are needed for running the specific application fragment. The resources can include images, icons, texts, audios, videos, 3D models, or other data included in the video game application.

In one embodiment, at step 450, for each specific application fragment of the application fragments, the server incorporates resources that are needed for running the specific application fragment into the specific application fragment, based on the resource dependency data structure. In another alternative embodiment, the resources are not incorporated in the fragments. Instead, the server streams, via the network component, resources that are needed for running the application fragment to the computing device, based on the resource dependency data structure.

At step 460, the server determines that a second application fragment follows a first application fragment. In an embodiment, the server accesses the fragments relationship data structure to determine that the second application fragment follows the first application fragment. In another embodiment, the server sends the fragments relationship data structure to a computing device, for example a mobile device. The mobile device accesses the fragments relationship data structure to determine that the second application fragment follows the first application fragment. The mobile device sends a request for the second application fragment to the server based on the determination that the application fragment follows the first application fragment. The server determines that the second application fragment follows the first application fragment by receiving the request for the application fragment.

At step 470, following a process similar to step 460, the server determines that a third application fragment follows a first application fragment.

At step 480, the server determines a likelihood that the second and the third application fragments will follow the first application fragment during operation of the video game application. In an embodiment, the server determines the likelihood by accessing a data structure containing a fragment likelihood indicator, such as fragment likelihood indicator 325 of FIG. 3. In an embodiment, the server determines the likelihood by receiving a request for either the second or the third application fragments from a computing device. The computing device, in an embodiment running an intermediary application, determines the likelihood by accessing a data structure containing a fragment likelihood indicator, such as fragment likelihood indicator 325 of FIG. 3.

Based on the fragment likelihood indicator, for example when a comparison of the fragment likelihood indicator of the second application fragment and the fragment likelihood indicator of the third application fragment indicate that the second application fragment is more likely to be the next application fragment, the computing device requests the second application fragment from the server. The server determines that the second application fragment is more likely the next application fragment based on receiving the request for the second application fragment, the computing device having sent the second application fragment based on the determination of the computing device that the second application fragment is more likely than the third application fragment to be the next application fragment.

At step 485, the server receives an indication that a mobile device has adequate resources to accommodate an application fragment. In an embodiment, the mobile device determines that it has adequate resources to accommodate the application fragment. The mobile device determines its available resources, determines the resource requirements of the application fragment, and compares the available resources to the required resources to determine if the mobile phone has adequate resources to accommodate the application fragment. The mobile device sends a request for the application fragment to the server based on the determination that it has adequate resources to accommodate the application fragment. The server determines that the application fragment follows the first application fragment by receiving the request for the application fragment.

In an embodiment, the mobile device determines its available resources, and sends resource information including information regarding its available resources to the server. The resource information indicates that the mobile device has adequate resources to accommodate the application fragment, in that the resource information indicates an amount of available resources in excess of the resources required by the application fragment. The server determines the mobile device's available resources based on the mobile device's resource information, determines the resource requirements of the application fragment, and compares the mobile device's available resources to the required resources to determine if the mobile phone has adequate resources to accommodate the application fragment.

At step 490, the server streams, via a network component, the application fragment of the application fragments to a computing device, wherein the application fragment can potentially follow another application fragment currently running on the computer device based on the fragments relationship data structure. In an embodiment, the application fragment is streamed based on the indication of step 485 that the mobile device has adequate resources to accommodate the second application fragment, and based on the fragments relationship data structure indicating that the second application fragment follows the first application fragment during operation of the video game application, as determined in step 460. In an embodiment, the application fragment is streamed based on the determined likelihood of step 480 that the application fragment is more likely that another application fragment to be the next application fragment.

Figure 5:
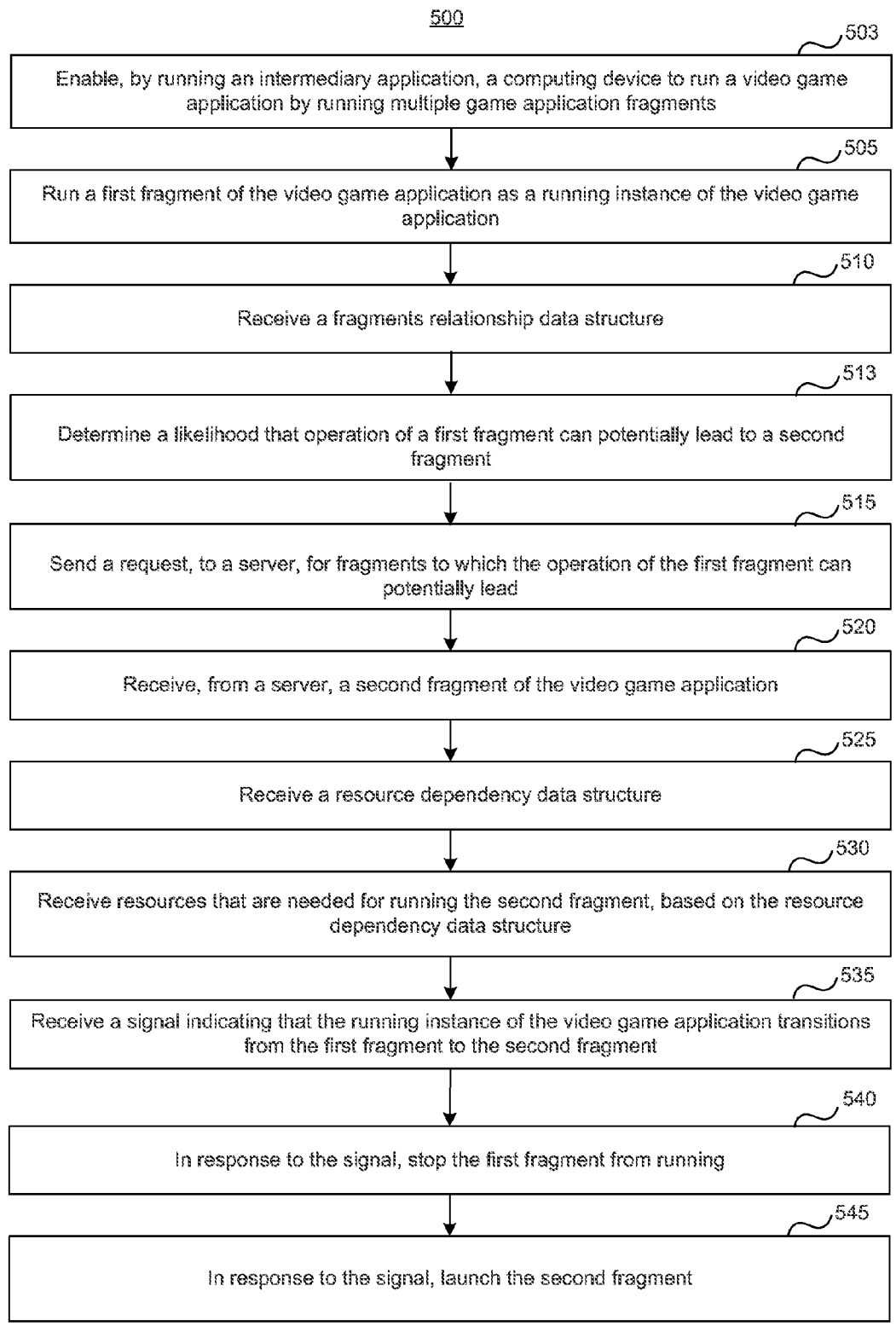
FIG. 5 illustrates an example of a process for receiving and running fragments of an application.

FIG. 5 illustrates an example of a process for receiving and running fragments of an application. At step 503, a computing device is enabled, by running an intermediary application, to run a computing application by running multiple game application fragments. In the example of FIG. 5, the computing application is a video game application, The intermediary application can be a container application, such as the container application discussed in the description of step 545. The intermediary application can act as an intermediary application between the video game application and application fragments by, for example: managing, launching, and/or closing the fragments of the video game application; controlling the computing device to execute the first application fragment; controlling the computing device to execute the first application fragment within the intermediary application; sending a command to the operating system of the computing device to execute the first application fragment; and/or determining the next application fragment that potentially follows the first application fragment, based on a fragments data structure; among others.

At step 505 of the process 500, the computing device runs a first fragment of the video game application as a running instance of a video game application. At step 510, the computing device receives a fragments relationship data structure. The fragments relationship data structure includes identifications of fragments that leads to another fragment of the video game application. In an embodiment, the fragments relationship data structure need not be sent to the computing device. A server uses the fragments relationship data structure to determine fragments to which a first fragment can potentially lead. The server sends a second fragment to the computing device based on the fragments relationship data structure indicating that the second fragment follows the first fragment during operation of the application.

At step 513, the computing device determines a likelihood that the operation of the first fragment can potentially lead to a second fragment during operation of the video game application. When the first fragment leads to only a second fragment, the likelihood is one hundred percent that the first fragment will lead to the second fragment. In an embodiment where the first fragment can lead to multiple next fragments, such as to the second and a third application fragment, the computing device determines the likelihood by accessing a data structure containing a fragment likelihood indicator, such as fragment likelihood indicator 325 of FIG. 3. In an embodiment where the first application fragment can lead to the second application fragment and the third application fragment, the computing device determines the likelihood by receiving either the second or the third application fragments from server. The server determines the likelihood by accessing a data structure containing a fragment likelihood indicator, such as fragment likelihood indicator 325 of FIG. 3.

Based on the fragment likelihood indicator, for example when a comparison of the fragment likelihood indicator of the second application fragment and the fragment likelihood indicator of the third application fragment indicate that the second application fragment is more likely to be the next application fragment, the server prioritizes and sends the second application fragment to the computing device. The computing device determines that the second application fragment is more likely the next application fragment based on receiving the second application fragment, the server having sent the second application fragment based on the server's determination that the second application fragment is more likely than the third application fragment to be the next application fragment.

At step 515, the computing device sends a request, to a server, for fragments to which the operation of the first fragment can potentially leads. As discussed related to step 420 of FIG. 4, an application fragment can have multiple next application fragments. In one example, the computing device is running a first fragment, and the first fragment can lead to a second fragment and a third fragment, each respectively at different times of operation. The computing device, while running the first fragment, requests and receives both the second and third fragments. The operation of the application in this instance leads to the third fragment, and does not lead to the second fragment. The computing device deletes the second fragment without having run the second fragment. Further, as discussed related to step 485 of FIG. 4, the request for the fragment can be based on a determination that the device has adequate resources to accommodate a fragment.

At step 520, the computing device receives, from a server, a second fragment of the video game application, wherein operation of the first fragment can potentially leads to the second fragment.

At step 525, the computing device receives a resource dependency data structure. The resource dependency data structure includes identifications of resources that are needed for running fragments of the video game application. At step 530, the computing device receives resources that are needed for running the second fragment, based on the resource dependency data structure. Alternatively, in some other embodiments, the second fragment itself includes resources that are needed for running the second fragment.

At step 535, the computing device receives a signal indicating that the running instance of the video game application transitions from the first fragment to the second fragment. At step 540, in response to the signal, the computing device stops the first fragment from running. At step 545, in response to the signal, the computing device launches the second fragment.

In some other embodiments, a computing device can run a container application responsible for managing, launching and closing the fragments of a video game application. The computing device receives a first fragment of the video game application from a server. Under the control of the container application, the computer device executes the first fragment. The container application can executes the first fragment within the container application itself; or the container application send commands to the operating system of the computing device to execute the first fragment.

Either the container application or the server determines the next fragment that potentially follows the first fragment. In one embodiment, the container application determines a second fragment of the video game application that follows the first fragment, based on a fragments relationship data structure; then the container application requests and receives the second fragment of the video game application from the server. In another embodiment, the container application generates and sends a request to the server for fragments to which an operation of the first fragment can potentially leads; then receives a second fragment determined by the server.

When the first fragment of the video game application ends its execution, the container application launches the second fragment accordingly to continue the execution of the video game application. Therefore, under the control of the container application, the video game application can run seamlessly on the computer device without the need that all fragments of the video game application has to be downloaded to the computing device. The container application can further delete ended fragments (e.g. the first fragment) from the computing device to save local storage space.

Figure 6:
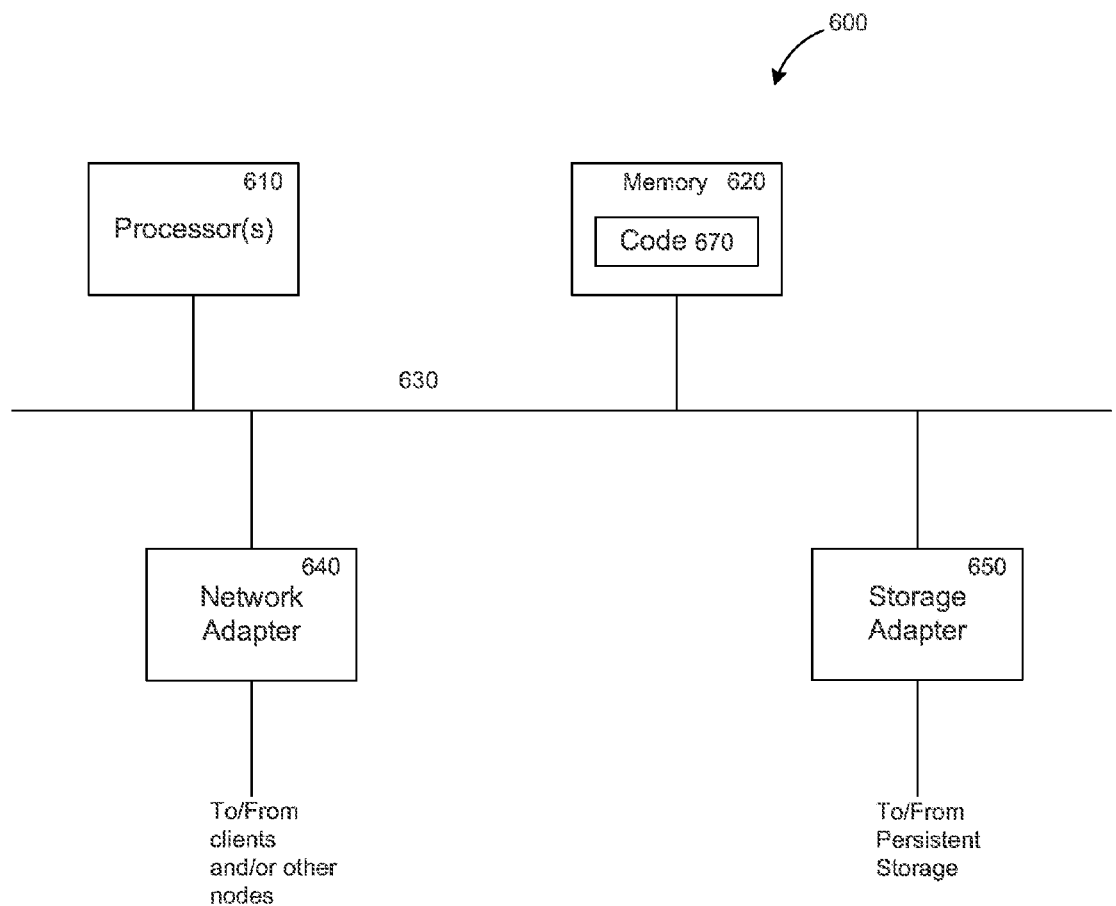
FIG. 6 is a high-level block diagram showing an example of the architecture of a computer, which may represent any computing device or server described herein.

FIG. 6 is a high-level block diagram showing an example of the architecture of a computer 600, which may represent any computing device or server described herein. The computer 600 includes one or more processors 610 and memory 620 coupled to an interconnect 630. The interconnect 630 shown in FIG. 6 is an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the computer 600 and, thus, control the overall operation of the computer 600. In certain embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computer 600. The memory 620 represents any form of random access memory (RAM), read-only memory (ROM), flash memory, or the like, or a combination of such devices. In use, the memory 620 may contain a code 670 containing instructions according to the technology disclosed herein.

Also connected to the processor(s) 610 through the interconnect 630 are a network adapter 640 and a storage adapter 650. The network adapter 640 provides the computer 600 with the ability to communicate with remote devices, over a network and may be, for example, an Ethernet adapter or Fibre Channel adapter. The network adapter 640 may also provide the computer 600 with the ability to communicate with other computers. The storage adapter 650 allows the computer 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computer 600 by downloading it from a remote system through the computer 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method comprising:
   enabling, by running an intermediary application at a mobile device, the mobile device to run the video game application by running multiple game application fragments, the intermediary application acting as an intermediary between the video game application and the game application fragments by determining a next game application fragment for each of the game application fragments, the game application fragments having previously been determined based on an analysis of user interfaces of the video game application such that each of the game application fragments is capable of displaying at least one user interface associated with the video game application, at least one of the game application fragments having previously been determined based on a correspondence to a graphics module of the video game application;
   running, at the mobile device, an instance of the video game application by running a first application fragment of the game application fragments at the mobile device;
   requesting, by the intermediary application, a second application fragment of the game application fragments corresponding to a second portion of the video game application based on data from a fragments data structure indicating that the second application fragment follows the first application fragment during operation of the computer application; and
   receiving, at the mobile device, the second application fragment.

2. The method of claim 1, further comprising:
launching the instance of the video game application by running the first application fragment;
receiving a signal indicating that the running instance of the video game application transitions from the first application fragment to the second application fragment; and
in response to the signal, launching the second application fragment.

3. The method of claim 1, further comprising:
receiving the second application fragment including resources that are needed to run the second application fragment, the resources determined based on a resource dependency data structure that identifies resources that are needed to run each of the game application fragments.

4. The method of claim 1, further comprising:
receiving the fragments data structure; and
accessing the data from the fragments data structure to obtain an indication that the second application fragment follows the first application fragment.

5. The method of claim 1, further comprising:
requesting, by the intermediary application, a third application fragment of the game application fragments corresponding to a third portion of the video game application based on data from the fragments data structure indicating that the third application fragment follows the first application fragment during operation of the computer application;
receiving the third application fragment;
receiving a signal indicating that the running instance of the video game application transitions from the first application fragment to the third application fragment; and
in response to the signal, launching the third application fragment.

6. The method of claim 5, further comprising:
deleting, at the mobile device, the second application fragment without having run the second application fragment.

7. A method comprising:
receiving, at a computer system and from an intermediary application running on a mobile device, a request to stream a video game application, the intermediary application enabling the mobile device to run the video game application by running multiple game application fragments;
in response to the request to stream the video game application, streaming, by the computer system and to the mobile device; a first application fragment of the game application fragments corresponding to a first portion of the video game application, the first application fragment having previously been determined based on the analysis of the user interfaces of the video game application such that the first application fragment is capable of displaying at least one user interface associated with the video game application;
determining, by the computer system, that a second application fragment follows the first application fragment based on an access of a fragments relationship data structure, the fragments relationship data structure associating the first application fragment with the second application fragment based on a determination that the second application fragment follows the first application fragment during operation of the computer application;
accessing, by the computer system, a storage device containing the second application fragment and a third application fragment of the game application fragments, the third application fragment corresponding to a user interface associated with a graphics module of the video game application, the third application fragment having previously been determined based on the analysis of the user interfaces of the video game application such that the third application fragment is capable of displaying at least the user interface associated with the graphics module; and
streaming, by the computer system and to the mobile device, the second application fragment based on the determination that the second application fragment follows the first application fragment.

8. The method of claim 7, further comprising:
determining that the second application fragment follows the first application fragment by accessing the fragments relationship data structure to obtain an indicator for the second application fragment.

9. The method of claim 7, wherein the third application fragment follows the first application fragment, and wherein a data structure includes likelihood data indicating a likelihood that the second and the third application fragments will follow the first application fragment during operation of the video game application, the method further comprising:
streaming the second application fragment based on the likelihood data indicating that the second application fragment is more likely than the third application fragment to follow the first application fragment.

10. The method of claim 7, further comprising:
receiving, from the intermediary application, a request for the second application fragment,
the intermediary application having sent the request based on the fragments relationship data structure indicating that the second application fragment follows the first application fragment during operation of the computer application; and
determining that the second application fragment follows the first application fragment based on the access of the fragments relationship data structure by receiving the request for the second application fragment, the request indicating that the intermediary application accessed the fragments relationship data structure to determine that the second application fragment follows the first application fragment.

11. The method of claim 7, wherein the first application fragment corresponds to a first user interface that corresponds to displaying a first level of the video game application, wherein the second application fragment corresponds to a second user interface that corresponds to displaying a second level of the video game application, and wherein the second application fragment follows the first application fragment in response to a transition from the first level of the video game application to the second level of the video game application.

12. The method of claim 7, wherein the first application fragment was determined based on an analysis of a first user interface corresponding to a first level of the video game application such that the first application fragment is capable of displaying the first level of the video game application, and wherein the second application fragment was determined based on an analysis of a second user interface corresponding to a second level of the video game application such that the second application fragment is capable of displaying the second level of the video game application.

13. The method of claim 7, wherein the first application fragment corresponds to a first user interface and includes images, icons, text, audio, video, 3D models, or other resources needed to display the first user interface, and wherein the second application fragment corresponds to a second user interface and includes images, icons, text, audio, video, 3D models, or other resources needed to display the second user interface.

14. The method of claim 7, wherein the first application fragment corresponds to a first level of the video game application, wherein the second application fragment corresponds to a help portion of the video game application, and wherein the second application fragment follows the first application fragment in response to receiving an indication that a user wants help.

15. The method of claim 7, wherein the first application fragment corresponds to a first scene in the video game application, wherein the second application fragment corresponds to a second scene in the video game application, and wherein the second application fragment follows the first application fragment in response to a transition from the first scene to the second scene.

16. A method comprising:
  determining, by a computer system, multiple game application fragments of a video game application, the game application fragments to be sent in response to a request from an intermediary application running on a mobile device that enables the mobile device to run the video game application by running the game application fragments, wherein each of the game application fragments includes resources to present at least one interface associated with the video game application;
  determining, by the computer system, a game application fragment of the game application fragments that corresponds to a graphics module of the video game application;
    storing, by the computer system, the game application fragments at a storage device; and
    generating, by the computer system, a resource dependency data structure, wherein, for each specific game application fragment of the game application fragments, the resource dependency data structure includes an identification of resources that are needed to run the specific game application fragment.

17. The method of claim 16 further comprising:
  generating a fragments relationship data structure based on a determination, for each specific game application fragment, of a subset of the game application fragments that follow the specific game application fragment during operation of the video game application.

18. The method of claim 17, wherein the fragments relationship data structure indicates that a second game application fragment and a third game application fragment each follow, as a next game application fragment, a first game application fragment during operation of the video game application at respectively different times of operation, the first, the second, and the third application fragments each being a different one of the multiple game application fragments of the video game application, the method further comprising:
  determining a likelihood that the second and the third game application fragments will follow the first game application fragment during operation of the video game application, the likelihood to be used to prioritize a selection of one of the second or the third game application fragments to send to the mobile device.

19. The method of claim 18, further comprising:
  determining the likelihood that the second and the third game application fragments will follow the first game application fragment by running the video game application on an emulator, that simulates the video game application running on a selected mobile device, to determine the likelihood.

20. The method of claim 16, further comprising:
  streaming resources that are needed to run a first game application fragment to a computing device used to run the video game application, the identification of the resources based on the resource dependency data structure.

21. The method of claim 16, further comprising:
  determining the game application fragment that corresponds to the graphics module by running the video game application using an emulator that simulates the video game application running on a selected mobile device.

22. A system comprising:
  a communication device through which to communicate with remote devices;
  a storage device;
  a processor coupled to the communication device and to the storage device; and
  a memory coupled to the processor, the memory storing instructions which when executed by the processor cause the system to perform operations including:
  receiving, from an intermediary application running on a mobile device, a request to stream a video game application, the intermediary application enabling the mobile device to run the video game application by running multiple game application fragments, the intermediary application acting as an intermediary between the video game application and the game application fragments by controlling the mobile device while the mobile device executes a game application fragment of the game application fragments;
  streaming, via the communication device and to the mobile device; a first application fragment of the game application fragments corresponding to a graphics module of the video game application, the first application fragment having previously been determined based on an analysis of the user interfaces of the video game application such that the first application fragment is capable of displaying at least a user interface associated with the graphics module;
  determining that a second application fragment follows the first application fragment based on an access of a fragments relationship data structure, the second application fragment having previously been determined based on a determination that the second application fragment follows the first application fragment during operation of the computer application; and
    streaming, via the network interface and to the mobile device, the second application fragment based on the determination that the second application fragment follows the first application fragment.

23. The method of claim 22, the operations further including:
  determining that the second application fragment follows the first application fragment by accessing the fragments relationship data structure to obtain an indicator for the second application fragment.

24. The method of claim 22, wherein a third application fragment follows the first application fragment, and wherein a data structure includes likelihood data indicating a likelihood that the second and the third application fragments will follow the first application fragment during operation of the video game application, the operations further including:

streaming the second application fragment based on the likelihood data indicating that the second application fragment is more likely than the third application fragment to follow the first application fragment.

25. The method of claim 22, further comprising:

receiving, from the intermediary application, a request for the second application fragment, the intermediary application having sent the request based on the fragments relationship data structure indicating that the second application fragment follows the first application fragment during operation of the computer application; and determining that the second application fragment follows the first application fragment based on the access of the fragments relationship data structure by receiving the request for the second application fragment, the request indicating that the intermediary application accessed the fragments relationship data structure to determine that the second application fragment follows the first application fragment.

\* \* \* \* \*